Sept. 22, 1964  G. K. WILLECKE ETAL  3,150,312
POWER SUPPLY FOR ARC WELDING PROCESSES
Filed Aug. 1, 1960  4 Sheets-Sheet 1

INVENTORS.
Gerhard K. Willecke
BY Don J. Corrigall

Andrus & Starke
Attorneys

INVENTORS.
Gerhard K. Willecke
Don J. Corrigall
BY
Andrus & Starke
Attorneys

United States Patent Office 3,150,312
Patented Sept. 22, 1964

3,150,312
POWER SUPPLY FOR ARC WELDING PROCESSES
Gerhard K. Willecke and Don J. Corrigall, Appleton, Wis., assignors to Miller Electric Manufacturing Company, Appleton, Wis., a corporation of Wisconsin
Filed Aug. 1, 1960, Ser. No. 46,580
10 Claims. (Cl. 323—89)

This invention relates to power supply supplying alternating current for arc welding processes and particularly to an alternating current power supply having a saturable reactor control creating an output current waveform with a rapid passage through zero for arc welding.

Arc welding is employed to join metal members by passing current through an arc established between juxtaposed metal members.

The present invention is particularly directed to arc welding processes employing the commercially available alternating current (hereinafter referred to as A.C.) and the like wherein the direction of current flow in the arc reverses periodically with successive halves of the current wave being similar in shape and area. Thus, commercial alternating current having a frequency of 60 cycles per second reverses the direction of flow 120 times each second or twice for each cycle of the current.

In reversing, the current must pass through a zero current value which extinguishes the arc. The restriking of the arc presents rather serious problems and consequently, the more rapidly the current approaches and passes through the zero point, the more stable will be the arc.

Normally, the arc is supplied through a suitable step-down transformer which is adapted to be connected to commercial incoming power lines. These power lines generally supply power at a relatively high voltage, and the transformer reduces the voltage to a safe level which is suitable for arc welding. Adjustable means are associated with the output circuit of the transformer to vary the amplitude of current flow through the arc.

The current supplied to the arc may be adjusted by different devices including various saturable reactor control means. A saturable reactor control in a transformer welding supply basically includes an A.C. load winding means connected in series with the arc. The A.C. load winding means is wound on a suitable magnetic core structure in common with a control winding which is energized with a direct current (hereinafter referred to as D.C.) to permit adjustment of the saturation level or flux carrying ability of the core.

The A.C. load winding constitutes an impedance or opposition to the flow of current in the circuit. The magnitude of the impedance of the A.C. winding is dependent upon the saturation level of the core. Consequently, by adjusting the D.C. saturation level of the core, the magnitude of the impedance can be changed. By increasing the saturation of the core, the opposition to current flow is reduced and conversely by reducing the saturation of the core, the opposition to current flow is increased.

A saturable reactor control uses a relatively low-voltage D.C. current in a control winding means to adjust the arc welding current. Consequently, control is provided in a safe and rapid manner which is particularly adapted to remote control and with relatively infinite adjustment.

However, an iron cored reactor in the output circuit may introduce distortion into the welding current tending to cause excessive dwell adjacent the zero or reversing point of the A.C. current. One well-known method of avoiding the effect of the saturable reactor is the insertion of an air gap in the A.C. flux path in the reactor core. The air gap has a substantial effect on the magnetic characteristics of the core and is such as to steepen the current wave near the zero level. However, the current still passes through the zero point at a relatively slow rate.

A most advantageous current wave for arc welding purposes is generally as shown in the U.S. Patent 1,612,084 to J. M. Weed which issued December 28, 1926. Referring to FIG. 1 therein, this patent discloses an arc welding system having an alternating current power source with a saturable reactor current control in series with the arc. The core structure includes air gaps in accordance with all conventional practice in order to reduce the distortion in the current wave at low values of saturation.

The Weed patent further teaches that the most desirable wave shape is a more or less rectangular wave in order to establish a practically instantaneous passage from one maximum value of current to the other. Weed teaches that high saturation of the saturable reactor cores in combination with a choke in the direct current control circuit produces such a wave. The auxiliary choke is an impedance which reduces the even harmonic components of A.C. generated in the direct current circuit. These harmonics, if not suppressed, in accordance with the Weed patent hamper the achievement of the ultimate objective, mainly a current wave which is exceptionally steep-sided at the zero crossover points. Weed discloses alternative circuits which eliminate the choke and provide a duplicate circuit interconnected with proper phasing to completely cancel the even harmonics.

The apparatus as shown in FIG. 1 of the Weed Patent 1,612,084 includes two overlapping control ranges which for purposes of discussion may be denoted as the low current control range and high current control range.

In the low current control range, the cores of the reactor are at low levels of satuation and consequently, the ideal wave cannot be obtained. The air gaps are inserted to reduce the distortion in the welding current to a level permitting maintenance of a stable arc. The air gaps reduce the range of control; that is, the ratio of change in welding current to any given change in the D.C. control current is reduced. Although this is, of course, undesirable, the design is a compromise to maintain a stable arc at the low levels of saturation.

In the high current control range, the cores of the reactor are substantially saturated and establish the generally rectangular wave illustrated in Weed. The air gaps do not have any noticeable effect on the wave shape when the cores have been heavily saturated and simply increase the D.C. power necessary to saturate the core. However, because the air gaps are necessary at the low levels of saturation, the disadvantage in the high current control range is accepted to establish a complete control range.

In the Weed structure, in order to saturate the saturable reactor cores, a relatively high-voltage D.C. source must be employed to overcome the resistance introduced by the many turns in the choke coil needed for the choke to be highly inductive.

The applicants have found that although the harmonic content of a welding current effects the wave shape, the phase relationship of the harmonic to the fundamental frequency is much more significant in producing a wave shape particularly useful in maintaing a stable welding arc.

The addition of a choke in the D.C. control circuit causes the harmonics to rapidly decrease in level after which they again increase. The various odd harmonics all effect the wave shape characteristic to some extent. However, the third harmonic has been found to greatly predominate and, as hereinafter described, constitutes the major harmonic in determining the producing of a good welding current for maintaining a stable arc. The other higher odd harmonics which function basically as the third harmonic are however much less significant and the following description refers generally to the third harmonic.

After the first initial drop, the several odd harmonics tend to again diverge relative each other, with the third harmonic varying somewhat more than the other harmonics and becoming greater and lesser in percentage content. However, the difference never approaches the level of the initial divergence existing in the low D.C. excitation range primarily because the third harmonic suppression is appreciable.

However more importantly, the phase relationship of the harmonic content at the lowest or broken point in the trace of the third harmonic changes by 180 degrees into phase with the fundamental and causes the current to more rapidly pass through the zero axis without any dwell. After the initial drop in the third harmonic, applicants have discovered that the air gap in the saturable control means is not necessary to maintenance of a stable arc.

An air gap in the core structure of the choke in the D.C. control circuit is desirable, as hereinafter described, to maintain an optimum current wave shape over a wide current range.

The size of the air gap noticeably affects the location of the first low point in the third harmonic content and the subsequent relative divergence of the several harmonic currents, particularly the third. Thus, a small gap provides an initial dip in the third harmonic at a relatively low D.C. control current. However, the welding current wave at relatively high D.C. control current then is relatively peaked.

Thus, applicant has found that the combination of a predetermined air gap size in the choke and a cooperating forward direct current bias in a saturable reactor controlled welding machine provides a welding output current which has practically no distortion in the low D.C. current control levels and which changes at least adjacent the zero axis to approximate a square wave over a relatively wide range of control.

In accordance with the present invention, a welding current is established consisting of a fundamental component and one or more odd harmonic currents which are maintained in phase with the fundamental.

In accordance with another aspect of the present invention, a saturable reactor unit is inserted in series with the welding output as has been suggested in the prior art structures. However, in accordance with the present invention, the core structure of the saturable reactor is preferably formed as an essentially closed flux path having no air gap except such as may arise due to abutting members forming the core structure. The saturable reactor control coils are fed from a control circuit including a D.C. source in series with a choke coil which is adapted to establish a highly inductive circuit. The choke coil is carried by a core unit having a precisely dimensioned air gap and the control circuit further includes means to maintain a unidirectional forward flux bias on the saturable reactor. The air gap in the choke core unit and the unidirectional forward bias control current are closely correlated to position the initial dip or break in the trace of the third harmonic in the welding current at as low a unidirectional forward bias current consistent with a current wave adapted to establish and maintain a stable arc. The control thus exists from the low unidirectional forward bias and establishes an output current having nearly a sine wave at the low values of bias current and as the bias current increases the output current has a relatively steep straight line portion through the zero axis and then again approaching a sine wave.

The size of the air gap not only affects the initial dip or break in the trace of the third harmonic but further affects the length of the straight line portion in the current as a result of the relative effect upon the several harmonics. The output current is thus maintained over a relatively wide range of control with a passage through zero at a rate at least equal to a sine wave.

The direct current coils are fed through a highly inductive circuit and consequently a high voltage circuit is employed to properly energize the coils. This, of course, is not entirely satisfactory because of the shock hazards created. This is particularly true where a remote control unit is to be employed and consequently very carefully insulated and protected wires would have to be connected between the power source and the welding area.

In accordance with another aspect of the present invention, the high voltage circuit is maintained within the power source and a secondary or auxiliary reactor unit is connected in the alternating current side of the main saturable reactor control. A small variable resistor or the like of a low voltage characteristic is employed to control the secondary reactor unit and thus establish control of the main saturable reactor and of the main welding current. In this manner, a low voltage control is provided which may be readily and safely transported between the power supply and the welding area.

The present invention thus establishes an arc power supply having a phase controlled fundamental and odd harmonic content to create an extremely useful and efficient current wave shape over a very wide range of control. A minimum of simple and readily fabricated components can be employed and the apparatus is readily adapted for remote control.

The drawings furnished herewith illustrate the best mode presently contemplated for carrying out the invention.

Figure 1:
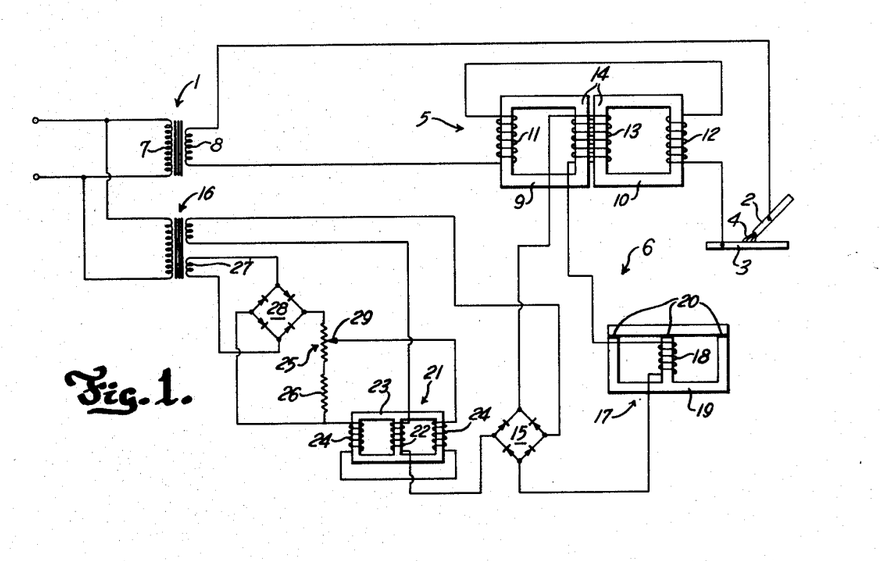
FIG. 1 is a schematic circuit diagram generally illustrating an embodiment of the present invention.

Referring to the drawings and particularly to FIG. 1, an arc welding system is illustrated including a main power transformer 1 having the input connected to a suitable power source, not shown, such as a commercial distribution system and having an output suitable for arc welding. An electrode 2 and a workpiece 3 are connected in series across the output of the main transformer 1 and an arc 4 is established therebetween by the power supplied from the main transformer 1. A saturable reactor control unit 5 is inserted in the output circuit of the main power transformer 1 to permit adjustment of the current supplied to the arc 4 for various arc welding processes with which the equipment may be employed. A D.C. control circuit 6 is connected to the saturable reactor control unit 5 to adjustably supply direct current to the reactor control unit 5 and to thus adjust the welding current.

The main transformer 1 is of any conventional or standard construction, preferably of a constant potential variety, and includes a primary winding 7 which is connected to the power source, not shown. A secondary winding 8 of relatively few turns is magnetically coupled to the primary winding 7 and the relative turns in the windings 7 and 8 reduce the voltage of the incoming power source to a level suitable for establishing and maintaining the arc 4.

The current supplied to the arc 4 is adjusted by suitable saturation of the saturable reactor control unit 5.

The illustrated saturable reactor control unit 5 includes a pair of similar rectangular cores 9 and 10 formed of suitable transformer steel. Each of the cores is formed as a continuous uninterrupted magnetic path; that is, essentially without air gaps. In the actual construction, the cores may be made up of U-shaped members having upper cross bars or the like to complete the rectangular path. Slight air gaps may be present between the U-shaped members and the cross bars. However, the cores are assembled without any intentional air gap being inserted into the core structures and care is preferably taken to actually minimize any air gaps which may be introduced during the assembling of the cores.

Similar A.C. control windings 11 and 12 are wound on cores 9 and 10, respectively, and connected in series between the work 3 and one side of the secondary winding 8 of transformer 1. The windings 11 and 12 introduce an impedance into circuit with the secondary winding 8. The impedance consists of the resistance of the windings 11 and 12 and the inductive reactance established by the flux associated with the current through the windings. The level of the impedance associated with the windings 11 and 12 is therefore dependent upon a series of predesigned conditions including the saturation or magnetic conductivity of the cores 9 and 10 as well as such other factors as the number of turns in the respective winding.

The magnetic conductivity of the cores 9 and 10 is preadjusted by a D.C. winding 13 wound upon adjacent legs 14 of the cores 9 and 10. The winding 13 is connected to the D.C. control circuit 6 which supplies an adjustable D.C. control current to the winding to establish predetermined saturation of the cores 9 and 10.

A small auxiliary transformer 16 is connected in parallel with the primary winding 7 of transformer 1 to the power source, not shown, to establish a current source suitable for energizing winding 13. A full-wave rectifier 15 is inserted between the transformer 16 and the D.C. winding 13 to supply a D.C. control current to winding 13.

The A.C. current flow in windings 11 and 12 establishes a varying A.C. flux in the cores 9 and 10 which links winding 13. The varying A.C. flux induces a voltage in the winding 13. In the illustrated embodiment of the invention, the windings 11 and 12 are connected in series and reversely wound to establish oppositely directed flux through the D.C. winding 13. Consequently, opposite and equal voltages are induced in the winding 13 with the net voltage being zero. This applies only to the fundamental and the odd harmonics in the circuit of D.C. winding 13. However, the even harmonics remain and tend to establish a corresponding A.C. current flow in the D.C. circuit.

A choke 17 includes a choke coil 18 connected in series circuit between the rectifier 15 and the windings 11 and 12 to substantially eliminate the even harmonics. The coil 18 consists of a relatively large number of turns of fine wire wound upon the central leg of a 3-legged magnetic core 19 and makes the series circuit including the winding 13 a highly inductive circuit. The inductive effect of the choke coil 18 does not unduly affect the D.C. current but does noticeably oppose the flow of harmonic currents in the D.C. circuit. Small air gaps 20 are inserted in the core 19 by forming the core from an E lamination and disposing suitable non-magnetic material between the ends of the arms of the lamination and a connecting upper bar. The size of the air gaps is determined as subsequently described.

Because of the great number of turns which must be employed in coil 18 to insert the necessary inductive reactance into the circuit, a substantial additional resistance is also inserted in the D.C. circuit. The resistance consumes power and consequently the D.C. power supply to the circuit must have a relatively high output voltage in order to establish sufficient D.C. current flow through the series circuit. In a conventional apparatus, voltages in the order of 100 volts or the like will normally be required.

In view of the relatively high voltages employed, it is not desirable to include a manually adjusted, variable resistance in the D.C. circuit, especially when the control is to be used remotely located from the machine because of the severe shock hazard which may be encountered.

In accordance with another aspect of the present invention, a small saturable reactor 21 includes an A.C. winding 22 connected in series between the auxiliary transformer 16 and the input to rectifier 15. The A.C. winding 22 is wound upon a suitable core structure 23 illustrated as continuous 3-legged core with winding 22 on the central leg. A pair of D.C. windings 24 are reversely wound on the outer legs of core structure 23 and connected to a direct current potentiometer 25 and a forward bias resistor 26. The reversely wound windings 24 have equal fundamental and odd harmonic voltages established therein by the small A.C. current in winding 22 with the voltage in the one winding 24 being of an opposite polarity from that in the other winding 24 and which voltages offset each other to prevent establishment of an A.C. current in the circuit of windings 24. The voltages due to the even harmonics in the small saturable reactor 21 are inconsequential and need not be eliminated.

A small additional auxiliary secondary winding 27 is provided on the auxiliary transformer 16 to establish a low voltage circuit suitable for energizing winding 24. The winding 27 is connected across the input to a full-wave rectifier 28 which has its output connected across the potentiometer 25 and the forward bias resistor 26.

A manually positionable potentiometer tap 29 is associated with the D.C. potentiometer 25 and connected to one side of the D.C. windings 24. The opposite side of the D.C. windings 24 is connected to the end of the forward bias resistor 26. Thus, by adjusting the position of the potentiometer tap 29, the portion of the potentiometer 25 connected across the D.C. windings 24 in series with resistor 26 is varied.

The illustrated embodiment of the invention is operated in the following manner.

The main transformer 1 and the auxiliary transformer 16 are connected to the incoming power source to simultaneously establish output voltages on the associated secondary windings.

The voltage across the secondary winding 8 is sufficient to establish and maintain an arc 4 between the electrode 2 and work 3.

The secondary windings of the small auxiliary transformer 16 are adapted to provide an output suitable for energizing of the main reactor control unit 5 and the small saturable reactor 21, respectively.

The small auxiliary transformer winding 27 on the auxiliary transformer 16 establishes a voltage drop across the potentiometer 25 and the forward bias resistor 26. This total potential drop is maintained constant during the entire operation of the device. However, the voltage applied across the D.C. windings 24 is equal to the portion of the potentiometer 25 connected between the potentiometer tap 29 and the variable forward bias resistor 26 in addition to the voltage drop or bias established across the forward bias resistor 26.

Thus, by varying the position of the potentiometer tap 29 the voltage applied across the control windings 24 is adjusted and the current flow in the winding changes accordingly. A change in the current in the winding varies the saturation of the associated core structure 23 and thus varies the impedance of the A.C. control winding 22.

The winding 22 is in series with the input to the full-wave rectifier 15 and varies the input current to the rectifier 15. The resulting change in the output of the rectifier 15 is reflected in the D.C. winding 13 and the saturation or magnetic conductivity of the main control cores 9 and 10. The impedance of the A.C. control windings 11 and 12 change accordingly and the welding current increases or decreases with the increased or decreased inductive voltage drop across the saturable reactor control unit 5.

The potentiometer 25 may be a relatively small and portable device to allow simple and remote control. Because the basic control circuit is energized from the low voltage across the potentiometer 25, the leads from the auxiliary transformer 16 to the potentiometer 25 may be very small and light. The low voltage eliminates any problem or possibility of shock hazards to the operator from the control unit.

The forward bias resistor 26 maintains a minimum D.C. voltage across the D.C. windings 24 and thus insures a minimum energization thereof and consequently of the D.C. winding 13 at all times.

As previously noted, the reverse relative winding of the windings 11 and 12 substantially eliminates all of the fundamental frequency current and the associated odd harmonics induced in the winding 13 as a result of the magnetic coupling between the A.C. control windings 11 and 12 and the D.C. winding 13. However, even harmonics remain in the circuit of winding 13 and result in odd harmonics in the welding circuit of windings 11 and 12.

In accordance with the prior art practice, the even harmonics should also be suppressed or removed as completely as possible. For example, the choke 17 should, in accordance with prior art practice, suppress the even harmonic as completely as possible.

Applicant has found that this is at most only a partial solution and that actually controlling the phase of the odd harmonics in the welding current provides the desirable rectangular current for arc welding.

In the illustrated embodiment of the invention, the choke 17 partially suppresses the harmonics to a varying degree dependent upon the size of the air gap 20 which has a pronounced effect on the action of choke 17; particularly as related to the magnitude and phase of the odd harmonics in the windings 11 and 12.

Generally, the most pronounced harmonic reflected into the welding current is the third harmonic. The higher harmonics become decreasingly smaller as the harmonic number becomes greater and are less significant.

FIGS. 2, 5, 10 and 16 graphically show the third harmonic content in the welding current as the D.C. bias current in winding 13 increases. The figures intermediate FIGS. 2, 5, 10 and 16 illustrate current wave shapes resulting from the harmonic content at various D.C. control currents.

Figures 2, 3, 4:
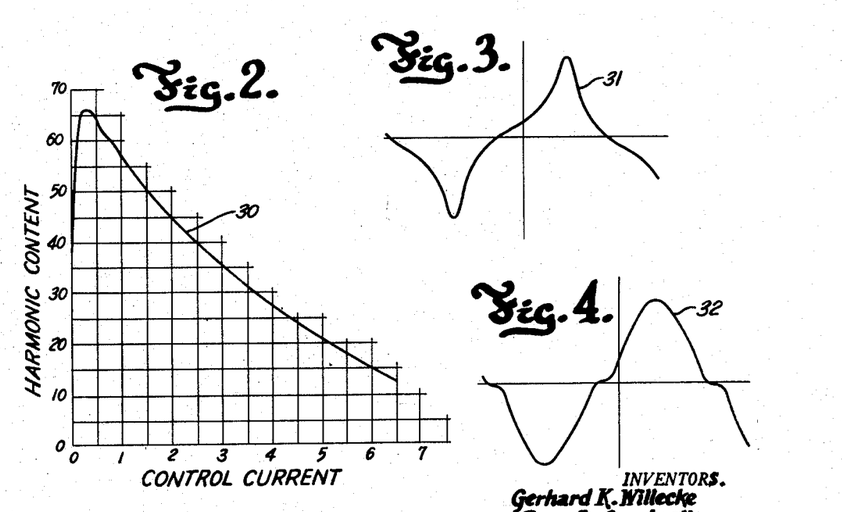
FIG. 2 is a curve illustrating the third harmonic content for a circuit similar to FIG. 1 with the choke coil eliminated.
FIG. 3 is a current wave taken at zero D.C. control current in FIG. 2.
FIG. 4 is a current wave taken at a high control current in FIG. 2.

Referring particularly to FIG. 2 in the drawings, the percent of the third harmonic which results when choke 17 is removed is shown. The third harmonic curve 30 rapidly rises to the relatively high value of approximately 65 percent and then slowly decreases as the D.C. current in winding 13 increases.

Referring particularly to FIGS. 3 and 4, current traces 31 and 32 are shown generally illustrative of a welding current resulting from a zero ampere D.C. current and a six ampere D.C. current position in FIG. 2. The reactor cores 9 and 10 result in distortion of the current wave with substantial dwells at the changes in the direction of current flow between a positive and negative value. Generally, for intermediate values of D.C. current excitation, the dwell is even more pronounced than that shown in FIGS. 3 and 4.

Figure 5:
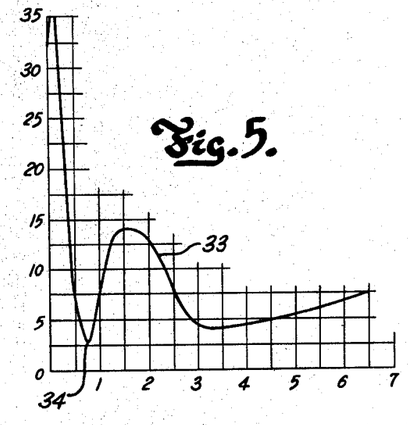
FIG. 5 is a curve showing the percent of the third harmonic with respect to the fundamental in the welding current with a circuit generally as shown in FIG. 1.

Referring particularly to FIG. 5, a third harmonic content plot 33 is illustrated as the result of inserting a choke 17 having a quarter inch air gap 20. As shown, the third harmonic plot 33 rapidly rises to approximately 35 percent and rapidly drops to a minimum point 34 as the D.C. control current is increased from zero to about .8 of an ampere. After the point 34 in curve 33, the third harmonic rises to approximately 15 percent distortion and again decreases and tends to level off with only a slight rise after the D.C. control current is aproximately 3 amperes.

The wave shape of the welding current is materially affected by the third harmonic current and is more importantly dependent upon the relative phase between the fundamental and the several harmonics as shown in FIGS. 6–9 and FIGS. 17–20.

Figure 6:
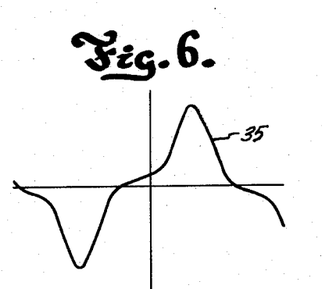
FIG. 6 is a current wave taken at zero D.C. control current in FIG. 5.
Figure 7:
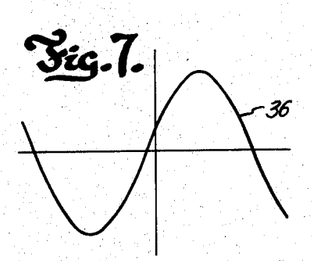
FIG. 7 is a current wave taken at low D.C. control current corresponding to the initial dip in the third harmonic content in FIG. 5.

Referring particularly to FIG. 6, a current trace 35 is illustrated for zero D.C. control current in FIG. 5. The current trace 35 is similar to current trace 31 of FIG. 3 and is not suitable for welding. In FIG. 7, a current trace 36 is illustrated for a D.C. control current coincident with the minimum third harmonic point 34 in FIG. 5. The current trace 36 closely corresponds to a sine wave and is adapted to establish and maintain a relatively stable arc. Between zero excitation and the excitation coincident with point 34, the current wave is less than a sine and is generally not suitable for arc welding.

Figure 8:
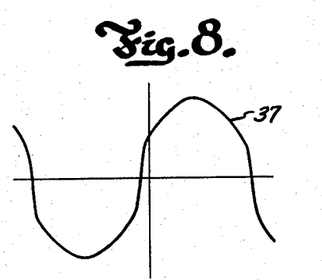
FIG. 8 is a current wave taken with an increased D.C. control current in FIG. 5.
Figure 9:
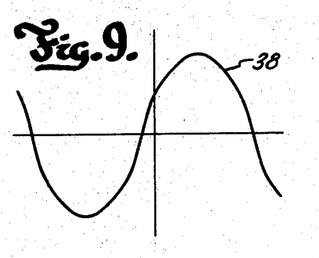
FIG. 9 is a current wave taken with a substantially higher D.C. control current in FIG. 5.

As the D.C. current is increased, the current immediately adjacent the reversing point tends to follow a more vertical line as shown by current trace 37 in FIG. 8. The current trace 37 is generally coincident with a one and one-half ampere D.C. excitation in FIG. 5. The rapid passage through zero provides a much more satisfactory current for maintaining a stable welding arc 4. As the D.C. excitation increases, the current changes and at substantial saturation again approaches a sine wave as shown by trace 38 in FIG. 9.

Although the relative percentage content of the several harmonics affects the wave shape, a comparison of FIGS. 4 and 8 illustrates that control of the harmonic amplitude alone is insufficient to produce the desired current wave. FIG. 4 is the current trace corresponding to six ampere D.C. excitation in FIG. 2 and FIG. 8 is the current trace corresponding to one and one-half amperes in FIG. 5. Referring to FIG. 2, the third harmonic content in current trace 32 of FIG. 4 is approximately 15 percent. Similarly, referring to FIG. 5, the third harmonic content in current trace 37 of FIG. 8 is also approximately 15 percent. However, notwithstanding the very similar third harmonic content, the current traces 32 and 37 are vastly different; the former being unsuitable for arc welding and the latter being very well suited for arc welding. Up to the initial dip in the third harmonic, such as point 34 in FIG. 5, the harmonic content distorts the wave to cause excessive dwells at the reversing axis. Following point 34, the effect of the harmonic content changes and rather than causing dwell, prevents dwell and establishes very rapid current passage. The different effect is due to the relative phase position of the harmonics. Applicant thus obtains a desirable current wave by control of the phase relationship of the harmonics and particularly the third harmonic, as most clearly shown in FIGS. 17–20.

Figure 17:
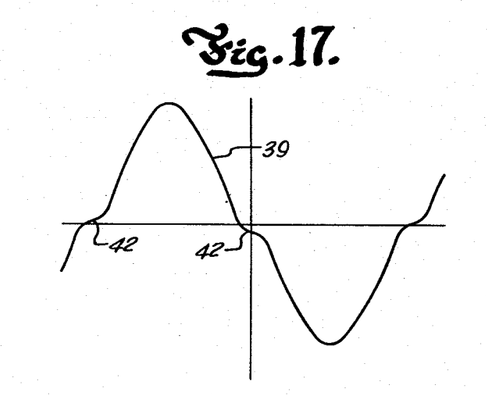
FIG. 17 is a current trace having a substantial dwell at the crossover point and thus similar to FIG. 6.
Figure 18:
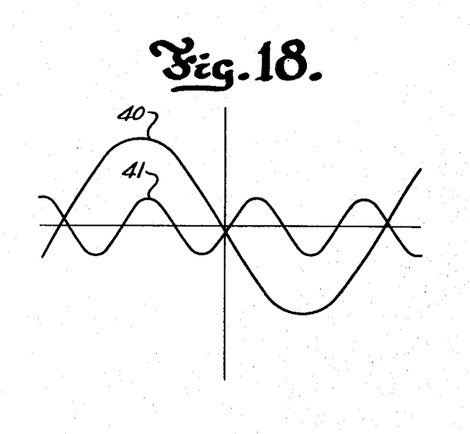
FIG. 18 is a pair of current traces showing the fundamental component and the third harmonic component of the current trace shown in FIG. 17.

Referring particularly to FIGS. 17 and 18, a current with a D.C. control below the initial dip in the harmonic components is analyzed. FIG. 17 is a total complex current trace 39. FIG. 18 illustrates the phase and amplitude of a fundamental component trace 40 and a third harmonic trace 41 of the complex current trace 39. In particular, the third harmonic trace 41 is 180 degrees out of phase with the fundamental component trace 40. The total complex current trace 39 exhibits a substantial dwell 42 at the changes in the direction of current flow between positive and negative value and is not suitable for arc welding.

Figure 19:
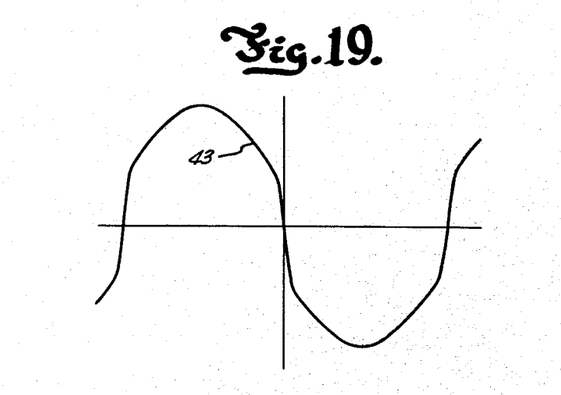
FIG. 19 is a current trace having a relatively rapid crossover between the negative and positive portions.
Figure 20:
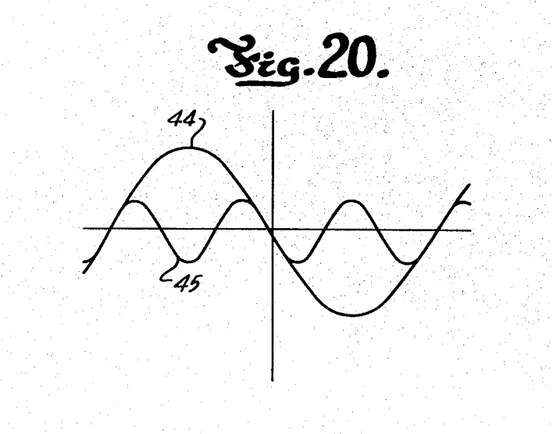
FIG. 20 is a view similar to FIG. 18 showing the fundamental component and the third harmonic component of the current trace shown in FIG. 19.

In FIGS. 19 and 20, a current with a D.C. control current above the initial dip in the third hamonic content is analyzed. FIG. 19 is a total complex current trace 43. FIG. 20, similar to FIG. 18, illustrates the phase and amplitude of a fundamental component 44 compared to a third harmonic trace 45 of the complex current trace 43. In FIG. 20, the third harmonic wave 45 clearly shows the in-phase relationship to the fundamental trace 44. Thus, at the initial dip in the third harmonic content, the harmonic shifts 180 degrees into phase with the fundamental component. The result is the complex current trace 43 having a rapid passage at the changes in the direction of current flow between positive and negative values.

The previous description is limited to the third harmonic which predominates for simplicity of explanation and because the higher odd harmonics of the total complex wave generally follow the pattern of the third harmonic.

In the illustrated embodiment of the invention, the necessary control of the harmonics is obtained through selection of the bias resistor 26 to establish a minimum D.C. control current corresponding to the initial dip in the third harmonic current in accordance with the present teaching. The resulting output current is then never less than a sine wave and includes over a considerable range a relatively steep front in the current wave. Although a true square wave is not obtained, the only real problem of arc stability occurs as the current is reversing. In the higher amplitude portions of the current wave, the current value is sufficient to maintain a stable arc.

Figure 10:
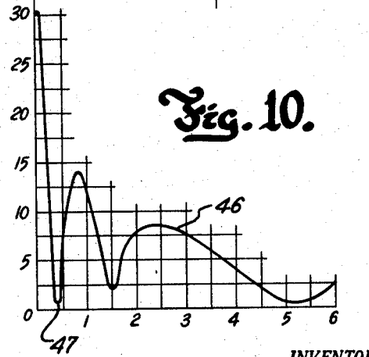
FIG. 10 is a curve generally similar to FIG. 5 showing the effect of decreasing the air gap in the choke.

Referring to FIG. 10, the third harmonic plot 46 which results from reducing the air gap from one-half to one-eighth inch is generally illustrated. The first low point 47 in the third harmonic curve 46 is reached with a somewhat smaller D.C. control current with the reduced air gap and the range of control is correspondingly increased. However, an increasing control current causes the third harmonic to fluctuate somewhat more greatly and results in somewhat less desirable wave shapes within certain ranges as shown in FIGS. 11–15.

Figure 11:
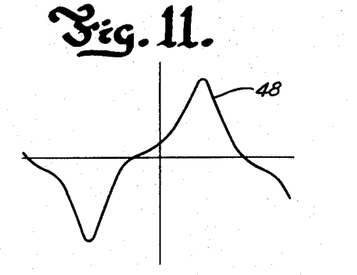
FIG. 11 is a current wave taken at zero D.C. control current in FIG. 10.
Figure 12:
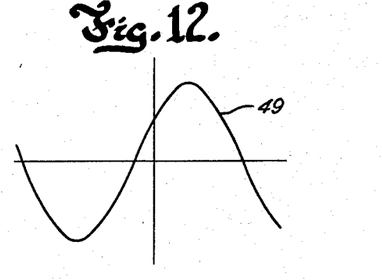
FIG. 12 is a current wave taken at low D.C. control current corresponding to the initial dip in the third harmonic content in FIG. 10.
Figure 13:
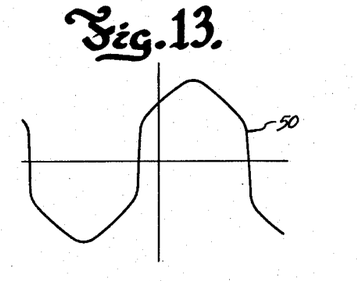
FIG. 13 is a current wave taken with an increased D.C. control current than FIG. 12.
Figure 14:
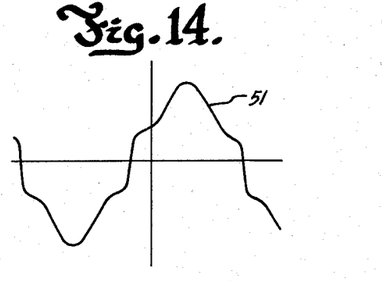
FIG. 14 is a current wave taken with a somewhat higher D.C. control current than FIG. 13.

FIG. 11 is a current trace 48 corresponding to zero excitation in FIG. 10 and, as in the prior illustrations, is not suitable for welding. FIG. 12 is a current trace 49 with D.C. excitation corresponding to the low point 47 in the third harmonic curve 46 in FIG. 10. As in FIGS. 5 and 7, the current trace 49 is essentially a sine wave and quite suitable for arc welding. FIG. 13 is a current trace 50 at a slightly increased D.C. excitation in FIG. 10 and generally corresponds to the current trace 37 in FIG. 8. A slightly increased D.C. excitation in FIG. 10 establishes a current trace 51 of FIG. 14. As shown in FIG. 14, the vertical line adjacent the zero axis is quite short and the wave relatively peaked. This results from the reduction in the air gap 20. A larger air gap maintains the length of the straight line portion and eliminates the relatively narrow peaked portion of the current wave. Thus, although the current trace 51 of FIG. 14 is suitable for arc welding, to obtain the most stable arc with a relatively wide output current range, the size of the air gap is a compromise.

Figure 15:
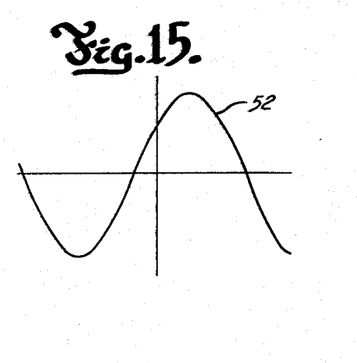
FIG. 15 is a current wave taken at a very substantial D.C. control current in FIG. 10.
Figure 16:
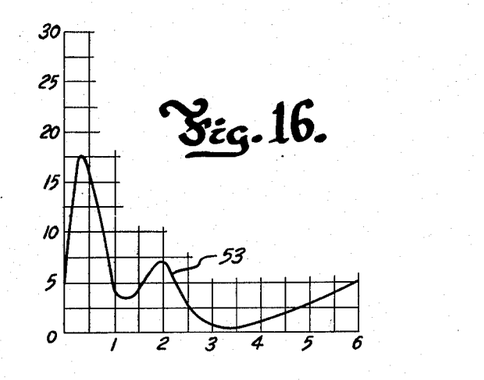
FIG. 16 is a curve similar to FIG. 5 which results from insertion of air gaps in the main control reactor structure.

FIG. 15 is a current trace 52 corresponding to relatively high D.C. control current in FIG. 10 and illustrates the return of the current wave to that of a sine wave. Thus, at substantial D.C. excitation the size of the air gap in the choke 17 does not noticeably change the wave shape.

In a practical machine, applicant has found that an air gap ranging generally between one-quarter and one-half inch depending upon reactor designs, produces an exceedingly satisfactory welding output current following the initial dip in the third harmonic current curve.

In accordance with the illustrated embodiment of the present invention, the forward bias resistor 26 is selected in accordance with the initial dip in the third harmonic curve to maintain a minimum level of saturation in the main control saturable reactor. The potentiometer 25 is employed to adjust the D.C. current supplied to the secondary reactor 21 and consequently to the saturable reactor control unit 5 between the minimum established by resistor 26 and a suitable maximum current.

Although the reactor cores 9 and 10 of the saturable reactor control unit 5 are preferably formed without air gaps as shown in FIG. 1, air gaps do not destroy the functioning of the apparatus. However, they do interfere with the range of control. Thus, referring to FIG. 16, a third harmonic plot 53 is shown when an air gap is inserted in each of the cores 9 and 10. An initial low point 54 in the third harmonic plot 53 is not obtained until somewhat over one ampere of D.C. excitation. In accordance with the present invention, the D.C. bias would therefore be set to exclude this current control below this point. Although the air gaps tend to improve the wave shape to a degree suitable for arc welding, the interference with welding current control is highly detrimental. Thus, air gaps in the core structure of the saturable reactor control unit interfere with the current control and are undesirable but do not eliminate the advantages of the present invention.

The apparatus of the present invention thus provides a current control over the portion of the control circuit which results in a stable arc. Establishment of a current wave which is less than a sine wave is positively prevented and a steep-fronted wave is established over a relatively large range of welding currents.

Further, the direct current control may be established with a low voltage circuit to permit safe and easily actuated remote control of the arc welding current.

Thus, the present invention provides a complex arc welding current including a fundamental component and an in-phase odd harmonic content to establish optimum operating characteristics for maintaining a very stable alternating current arc.

Various modes of carrying out the invention are contemplated as being within the scope of the following claims particularly pointing out and distinctly claiming the subject matter which is regarded as the invention.

We claim:

1. An arc welding power supply, which comprises means to establish a sinusoidal fundamental current, means to superimpose at least one odd harmonic current upon said sinusoidal fundamental current to establish an arc welding current, and current control means connected in a circuit with said two first named means to control the magnitude of the welding current, said current control means producing an in-phase relationship between the fundamental and the odd harmonic current and thereby providing a current wave having a current reversal essentially at least as steep as a sine wave.

2. In an arc welding power supply, a sinusoidal current source adapted to supply a sinusoidal output current, current control means to adjust said output current and to superimpose odd harmonics of the fundamental upon said sinusoidal output current, said current control means creating an initial output current range in which the third harmonic is much greater than other harmonics, and override means to operatively eliminate said initial current range and the substantial divergence of said odd harmonics and thereby establish an output current having a passage through zero never less than that corresponding to a sine wave and having a rectangular wave characteristic at the zero axis over a substantial current range.

3. In a transformer power supply having a transformer with a secondary winding adapted to establish an A.C. output suitable for maintaining an arc, a saturable control means having an A.C. control winding means connected in series between the secondary winding and the arc, said control means including a core structure defining an essentially closed magnetic path having a constant permeability linked with said A.C. control winding means and D.C. control winding means linked with said core structure to control the impedance of the A.C. control winding means, a D.C. current source, a choke connected in a series circuit with current source and said D.C. control winding means, said choke having an air gap, and means connected with said D.C. control winding means to maintain a preselected forward bias current supplied to said D.C. control winding means, said forward bias current and said air gap being interrelated generally in accordance with creation of a preselected lowest initial dip in the third harmonic current in the output current to maintain at least a sine wave characteristic in the output current.

4. In a transformer power supply having a transformer with a secondary winding adapted to establish an A.C. output suitable for maintaining an arc, a saturable control means having an A.C. control winding means connected in series between the secondary winding and the arc, said control means including a core structure defining an essentially closed magentic path having a constant permeability linked with said A.C. control winding means and D.C. control winding means linked with said core structure, a high voltage D.C. current source having an A.C. input circuit, a choke connected in a series circuit with said high voltage D.C. source and said D.C. control winding means, said choke having an air gap, a small saturable control means connected in said A.C. input circuit and having a low voltage D.C. input circuit, a low voltage D.C. source connected to said D.C. input circuit, and means connected with said small saturable control means to establish a preselected minimum forward bias current supplied to said D.C. control winding means, said forward bias current and said air gap being interrelated generally in accordance with creation of a predesigned lowest initial dip in the third harmonic current in the output current to maintain at least a sine wave characteristic in the output current.

5. In an arc welding power supply having a saturable reactor in the main power circuit to vary the welding current, a control circuit having an alternating current input circuit and a direct current output circuit connected to energize said saturable reactor, a high inductance choke inserted in said direct current output circuit, and having a choke core with an air gap, a saturable reactor having a control winding means in said input circuit and D.C. control winding means to adjust the impedance of the control winding means, a low D.C. voltage source adapted to energize the D.C. control winding means, a bias resistance, a potentiometer having a tap and being connected in series with the bias resistance across said low D.C. voltage source, and means connecting said D.C. control winding means to the potentiometer tap and to the opposite side of the bias resistance to establish a minimum D.C. excitation of said D.C. control winding means, said minimum D.C. excitation and said air gap in the choke core being selected to maintain at least a sine wave welding current.

6. In a transformer power supply having a constant potential transformer with a secondary winding adapted to establish an A.C. output suitable for maintaining an arc, a saturable control means having an A.C. control winding connected in series between the secondary winding and the arc, said control means including a core structure defining an essentially closed magnetic path having a constant permeability for the flux of said A.C. control winding and D.C. control winding means wound on said core structure and linked with the flux established by said A.C. control winding, a high voltage D.C. source, a choke connected in a series circuit with said high voltage D.C. source and said D.C. control winding means, said choke having an air gap, and means connected with said D.C. control winding means to maintain a preselected forward bias current supplied to said D.C. control winding means, said forward bias current and said air gap being interrelated generally in accordance with creation of a predesigned lowest initial dip in the third harmonic current in the output current to maintain at least a sine wave characteristic in the output current.

7. In a transformer power supply having a secondary transformer winding adapted to establish an A.C. output suitable for maintaining an arc, a saturable control means having a core structure without air gaps and having A.C. control winding means connected in series between the secondary winding and the arc and linked with the core structure, said saturable reactor including D.C. control winding means linked with said core structure, said A.C. control winding means and said D.C. control winding means being wound to eliminate fundamental and odd harmonic voltages in said D.C. control winding means, a rectifier having an output, a choke connected in series circuit with the output of said rectifier and said D.C. control winding means, said choke including a core structure having an air gap, an auxiliary transformer connected to said rectifier to supply current to the D.C. control winding means, a second saturable control means having A.C. winding means connected in series between the auxiliary transformer and the rectifier and having D.C. winding means to control the impedance of the associated A.C. winding means, a second rectifier connected to the D.C. winding means of the second saturable control means, said auxiliary transformer being connected to supply a low voltage to the second rectifier, a potentiometer interposed between the second rectifier and the D.C. winding means, and a fixed resistance means connected in series with the potentiometer to maintain a preselected forward bias current supplied to the D.C. control winding means of the first named saturable control means, said forward bias current and said air gap being interrelated generally in accordance with creation of a preselected lowest initial dip in the third harmonic current in the output current to maintain at least a sine wave characteristic in the output current.

8. In a transformer power supply having a transformer secondary winding establishing an A.C. output suitable for maintaining an arc, a saturable reactor having A.C. control winding connected in series between the secondary winding and the arc, a D.C. control winding, a substantially closed magnetic core magnetically coupling the A.C. control winding to the D.C. control winding, a control circuit having an A.C. input circuit and a D.C. output circuit connected to energize the D.C. control winding, a three-legged choke core having an air gap in each leg, a choke coil wound on the center leg and connected in series circuit with the D.C. control winding in the D.C. output circuit to said choke coil including a large number of turns to establish a highly inductive circuit, a control saturable reactor having a closed core and an A.C. winding wound on the closed core and connected in series in said A.C. input circuit, and means to establish a minimum forward bias current, said D.C. output circuit and the D.C. control winding.

9. In an arc welding power supply having an A.C. output circuit connected to establish and maintain an arc, a saturable reactor having a substantially closed core structure and an A.C. winding in series with the arc to carry the welding current, a D.C. control winding on the closed core structure, a control circuit having an alternating current input circuit and a direct current output circuit connected to the D.C. control winding, a high inductance choke having a large number of coil turns series connected with the D.C. control winding in the output circuit, and a saturable reactor having an A.C. bias control winding connected in said input circuit, said reactor including a substantially closed magnetic core carrying said bias control winding and a low voltage D.C. control winding.

10. In a transformer power supply having a transformer with a secondary winding adapted to establish an A.C. output suitable for maintaining an arc, a saturable control means having an A.C. control winding means connected in series between the secondary winding and the arc, said control means including a core structure defining an essentially closed magnetic path having an essentially constant permeability linked with said A.C. control winding means and D.C. control winding means linked with said core structure to control the impedance of the A.C. control winding means, a D.C. current source, means connected to energize said D.C. control winding to establish a minimum forward bias current corresponding to a 180 degree phase shift location of the odd harmonic content of the welding current to essentially eliminate dwell at the zero crossover point in the welding current.

References Cited in the file of this patent
UNITED STATES PATENTS

| | | |
|---|---|---|
| 1,612,084 | Weed | Dec. 28, 1926 |
| 1,812,202 | Dowling | June 30, 1931 |
| 1,862,487 | Wensley | June 7, 1932 |
| 2,883,563 | Sunderlin | Apr. 21, 1959 |
| 2,957,086 | Pettit | Oct. 18, 1960 |
| 2,962,608 | Kusko | Nov. 29, 1960 |